(12) United States Patent
Barrier (10) Patent No.: US 8,964,928 B2
(45) Date of Patent: Feb. 24, 2015

(54) DEVICE FOR GRIPPING FUEL ELEMENTS, ASSOCIATED CLAMP AND ASSOCIATED HANDLING SYSTEM

(75) Inventor: Patrick Barrier, Cherbourg (FR)

(73) Assignee: Areva NC, Paris (FR)

( * ) Notice: Subject to any disclaimer, the term of this patent is extended or adjusted under 35 U.S.C. 154(b) by 699 days.

(21) Appl. No.: 13/062,686

(22) PCT Filed: Sep. 7, 2009

(86) PCT No.: PCT/EP2009/061516
§ 371 (c)(1),
(2), (4) Date: Mar. 7, 2011

(87) PCT Pub. No.: WO2010/026241
PCT Pub. Date: Mar. 11, 2010

(65) Prior Publication Data
US 2011/0164718 A1    Jul. 7, 2011

(30) Foreign Application Priority Data

Sep. 8, 2008  (FR) ...................................... 08 56016

(51) Int. Cl.
*G21C 19/18*  (2006.01)
*G21C 19/32*  (2006.01)

(52) U.S. Cl.
CPC ............... *G21C 19/18* (2013.01); *G21C 19/32* (2013.01)
USPC ........................................................ 376/261

(58) Field of Classification Search
USPC ......... 376/260, 261, 262, 264, 265, 228, 270, 376/220, 237
See application file for complete search history.

(56) References Cited

U.S. PATENT DOCUMENTS

| | | | |
|---|---|---|---|
| 3,851,987 A * | 12/1974 | Jones | 403/374.4 |
| 3,902,963 A * | 9/1975 | Bertone et al. | 376/228 |
| 3,905,634 A | 9/1975 | Johnson et al. | |
| 3,945,514 A | 3/1976 | Dose | |
| 3,959,071 A * | 5/1976 | Bevilacqua | 376/228 |
| 3,959,072 A * | 5/1976 | Dupen | 376/237 |
| 4,202,728 A * | 5/1980 | Allain et al. | 376/270 |
| 6,501,813 B1 | 12/2002 | Soma et al. | |
| 2009/0175403 A1 * | 7/2009 | Suzuki et al. | 376/220 |

FOREIGN PATENT DOCUMENTS

| | | |
|---|---|---|
| CN | 1038964 A | 1/1990 |
| CN | 1072283 A | 5/1993 |
| CN | 1203429 A | 12/1998 |
| CN | 1291536 A | 4/2001 |
| CN | 1421376 A | 6/2003 |
| DE | 24 36 507 A1 | 2/1976 |

(Continued)

OTHER PUBLICATIONS

French Search Report in French Application No. FR 0856016, mailed May 11, 2009.
International Search Report and Written Opinion in International Application No. PCT/EP2009/061516, mailed Nov. 18, 2009.
Kai, Jiang et al., "Clipping Mechanism of Stock for 2JC-500 Grafting Machine", Journal of Agricultural Mechanization Research, 2008, Issue 2, pp. 116-118.

(Continued)

*Primary Examiner* — Samir Abdosh
*Assistant Examiner* — John D Cooper
(74) *Attorney, Agent, or Firm* — Nixon Peabody LLP (57) ABSTRACT

A fuel element handling system having a gripping device, the structure of which can be pushed in the horizontal position and uncoupled from the handling system if a failure occurs, uncoupling releasing the load formed by the fuel elements and their gripped support and putting them in a safe situation.

16 Claims, 6 Drawing Sheets

(56) References Cited

FOREIGN PATENT DOCUMENTS

| EP | 0360651 | A1 | 3/1990 |
|----|---------|----|--------|
| FR | 2368121 | A1 | 5/1978 |
| FR | 2699519 | A1 | 6/1994 |
| GB | 1135535 | A  | 12/1968 |
| GB | 1390303 | A  | 4/1975 |

OTHER PUBLICATIONS

Liu, J.G. et al., "Design and Full Scale Test of the Fuel Handling System", Nuclear Engineering and Design, vol. 218, Issues 1-3, Oct. 2002, pp. 169-178.

Search Report in Chinese patent application No. 200980133996.0, dated Mar. 1, 2013.

* cited by examiner

DEVICE FOR GRIPPING FUEL ELEMENTS, ASSOCIATED CLAMP AND ASSOCIATED HANDLING SYSTEM

CROSS REFERENCE TO RELATED APPLICATIONS or PRIORITY CLAIM

This application is a National Phase of PCT/EP2009/061516, filed Sept. 7, 2009, entitled, "DEVICE FOR GRIPPING FUEL ELEMENTS, AND RELATED CLAW AND HANDLING SYSTEM", and claims priority of French Patent Application No. 08 56016, filed Sep. 8, 2008.

TECHNICAL FIELD

This invention relates to the field of handling fuel elements.

More particularly, it relates to a device designed for this purpose which, if a failure occurs, could provide a solution for safely putting down the handled fuel element.

PRIOR ART

LWR type fuel elements are handled by gripping fuel elements, the elements to be handled being usually in an initial vertical gripping position.

In the current design, a vertical lifting system is installed within a feed cell so that spent fuel elements partially immersed in a pool in the vertical position can be gripped or picked up. When the fuel element is gripped, a pushing chain makes the vertical lift and pushes horizontally to a shear cell in which spent fuel elements are sheared into segments before being dissolved in a tank called a dissolver, full of acid.

This handling operation must be done safely and it must always be possible to put the fuel elements down in a safe place if any failure arises, particularly in order to put the installation back into good condition. Furthermore, if a failure occurs, it must be possible to make a repair without any human intervention, in other words solely by remote operated means.

Currently known equipment for handling fuel elements of are either vertical handling equipment or pusher systems.

At the moment, there is no device that performs vertical handling and horizontal pushing functions, but horizontal pushing is necessary to shear the fuel.

Therefore, the purpose of this invention is to disclose a solution for handling fuel elements that performs vertical handling and horizontal pushing functions to safely remove fuel elements, even if there is a failure in all or some of the handling system.

PRESENTATION OF THE INVENTION

Consequently, the first aspect of the invention relates to a fuel element gripping device comprising:
  a main carriage with a longitudinal axis;
  a clamp coupled to the main carriage and adapted to grip the head of fuel elements;
  a secondary carriage with a longitudinal axis comprising attachment means.

According to the invention, the main carriage and the secondary carriage are coupled to each other by means of transmitting forces applied on the attachment means when a device is lifted and when the device is pushed horizontally, the force transmission means being removably connected between the main carriage and the secondary carriage, and the main carriage and the secondary carriage are uncoupled from each other when the secondary carriage is blocked at its attachments by disassembly of the connection of the force transmission means with the carriages, disassembly being made by a single pull/push movement applied on the main carriage, tension being made towards the secondary carriage.

The invention thus lies in the fact that it discloses a fuel element gripping device that performs a handling function for fuel elements picked up in the vertical position, a pushing function for fuel elements picked up in the horizontal position (due to the carriages) that enables remote repair by so-called remote operated means (due to possible uncoupling between the carriages).

In other words, uncoupling between carriages of the gripping device makes it possible to release picked up fuel elements in the case of a failure in the vertical or horizontal position, and to perform maintenance operations.

Therefore, the advantage of an easily removable coupling between the different parts of the gripping device is that it offers a solution for putting the load (picked up fuel elements and their support) down if a failure occurs in complete safety, and enables repair operations. Failure cases considered are blocking of the lifting/pushing chain and gripping device electrical power supply failure.

Uncoupling as defined in this invention is easily done using a single mechanical pull/push movement between the carriages. Thus, no complex equipment is necessary to do the uncoupling if a failure occurs.

The head of the fuel elements gripped by the gripping device according to the invention is in the form either of a handle for BWR type fuel elements, or a part with an internal recess for PWR type fuel elements. Thus, any LWR (BWR+ PWR) type fuel element may be gripped by the gripping device according to the invention.

According to one advantageous embodiment, recoupling between the main carriage and the secondary carriage is done when the secondary carriage is blocked at its attachments, by reassembling the connection of force transmission means with the carriages, the connection being reassembled following a single push/pull movement applied to the main carriage, the pushing being made towards the secondary carriage.

Advantageously, the force transmission means in removable connection between the main carriage and the secondary carriage comprise:
  a first key mounted on the main carriage, tipping transverse to the longitudinal axis and stopped against the secondary carriage to enable forces applied on the attachment means to be transmitted during the horizontal push;
  a second key mounted on the main carriage, pivoting orthogonally to the longitudinal axis and stopped against the secondary carriage to enable forces applied on the attachment means to be transmitted during lifting; device in which the tension applied on the main carriage enables tipping of the first key, the relative movement of the main carriage towards the secondary carriage and then pivoting of the second key, the first tipped key and the second pivoted key each remaining in a position without a stop in contact with the secondary carriage.

The main carriage may comprise two rigid parts flexibly connected to each other, in which:
  one is coupled with the clamp and comprises an electronic weigh scale to electrically test tension or compression forces applied on said rigid part supporting the clamp;
  the other comprises a so-called head carriage coupled with the secondary carriage and a gripping socket by which the uncoupling pull/push movement between the head carriage and the secondary carriage is performed.

According to one variant embodiment, the main carriage comprises:

an electric motor;

a hollow shaft mounted in translation with one of its ends fitted with a screw/nut type drive engaged with the electric motor, and the other of its ends bearing on part of the clamp gripping arms, actuation of the electric motor causing translation of the shaft in one direction and simultaneously moving the clamp gripping arms towards or away from each other by tipping orthogonally to the axis.

The gripping device according to the invention advantageously comprises a coupling lever fixed to the main carriage and arranged to form a lever arm to translate the shaft and uncouple it from the clamp, the lever arm being adapted so that it can be manipulated by remotely operated means. Thus, if a failure occurs in the electric motor, the remote operated means can be used to uncouple the clamp gripping the head of the fuel elements and thus release them, for example into a fuel element shear cell.

Any remote-operated means that are usually used or that can be used in a nuclear fuel recycling environment, particularly in the feed and control cell on the input side of the shear cell of the spent fuel to be recycled, are suitable for the invention.

According to one embodiment of the gripping device, the clamp comprises a body on which the gripping arms are installed free to tip and on which a rod is installed free to slide along the axis between the arms;

the hollow shaft comprises a rod fixed inside it, the rod of the hollow shaft bearing in contact with the clamp rod, the length of the clamp rod being such that in the near or the far extreme position of the clamp arms corresponding to the gripping position of the fuel element head, there is a direct contact between the head and the clamp rod.

Preferably:

the rod fixed inside the hollow shaft comprises a projection that extends transverse to the axis forming a flag;

the main carriage comprises a first position detector arranged so as to be facing the flag so that it electrically detects direct contact between the head of the fuel elements and the clamp rod.

According to one advantageous embodiment of the invention, the main carriage comprises pins installed to tip orthogonally to the longitudinal axis, the clamp body comprises a wall with steps;

the shaft comprises relief fixed to its periphery; coupling between the clamp and the shaft being made by the relief tipping the pins and by the tipped pins bearing in contact with the steps in the clamp body.

The means of locking the coupling between the main carriage and the clamp advantageously may consist of a pin inserted inside the wall of the clamp body transverse to the longitudinal axis of the main body to block one in translation relative to the other, the pin being designed so that it can be removed by remote-operated means. Thus as explained later, if a failure occurs the clamp can be released from the main carriage by using remote-operated means to remove this pin.

According to one variant embodiment:

the hollow shaft comprises a projection that extends transverse to the axis forming a flag;

the main carriage comprises a first and a second position detector each arranged so as to be facing the flag in a given translated position of the hollow shaft to electrically detect a given translated position of the relief and therefore detect whether or not the pins are tipped.

According to another advantageous variant embodiment:

the clamp body comprises a projection that extends transverse to the axis, forming a flag;

the main carriage comprises a third position detector arranged to be facing the flag when the clamp is coupled with the main carriage, and the flag thus electrically detects the presence of the clamp.

According to another aspect, the invention relates to a fuel element handling system comprising:

a tipping crane comprising a drum inside which carriages of the gripping device as described above are installed free to slide;

a handling system comprising a lifting/pushing system, part of which is fixed to the attachment means of the secondary carriage of the gripping device as described above, the lifting/pushing system rolling the gripping device into the horizontal position towards the outside of the tipping crane drum.

The invention also relates to a clamp comprising:

a body with a longitudinal axis;

gripping arms installed free to tip orthogonally to the longitudinal axis on the body and comprising recesses;

a rod installed free to slide inside the body along the longitudinal axis, the rod comprising tabs arranged as claws that extend transverse to the axis and with a shape complementary to the shape of the recesses, the claws being arranged to engage in the recesses of the gripping arms in a translated position of the rod and thus block the gripping arms in an extreme open or closed position.

The rod of the clamp according to the invention is made sufficiently long at the free end of the gripping arms so as to detect the presence of an element to be picked up by direct contact when the claws block the arms in the extreme open or closed position.

Obviously, a specific type of clamp is associated with a fuel element type to be handled.

According to another aspect, the invention relates to a method for handling fuel elements in which if a failure occurs during a handling operation:

part of a device for gripping fuel elements is attached to mechanical standby handling means;

part of the gripping device attached to the mechanical standby means is uncoupled from the remaining of the gripping device attached to the mechanical operational handling means using remote-operated means.

The handling operation may be either lifting, or horizontal tipping or horizontal pushing.

Actuation of the remote-operated means advantageously makes a single pull-push movement separating the parts of the gripping device from each other.

Thus as mentioned above, the invention consists of designing and making a gripping device and associated clamp and handling means that enable:

1/ normal operation (in other words without a failure):

vertical and horizontal handling of many types of fuel elements;

gripping of these fuel elements;

checking the presence of the picked up fuel elements;

selection and placement of various gripping clamps as a function of the family of fuels to be picked up;

an electrical check of the presence of a clamp;

check forces passing through the kinematic handling chain;

check the position of the various movements (presence of the fuel element, presence of the clamp, check the two extreme positions of the clamp pins, namely clamp closed and clamp open).

2/ degraded mode (in other words if a failure occurs):

A/ in the vertical position:

uncoupling of part of the gripping device comprising the clamp and the picked up fuel element, from the operational lifting chain;

gripping of the uncoupled part of the gripping device comprising the clamp and the picked up fuel element, by another lifting means;

release of the picked up fuel element from the uncoupled part of the gripping device and then placement in an appropriate rack;

B/ in the horizontal position:

uncoupling between the part of the gripping device comprising the clamp and the picked up fuel element and the operational pushing chain;

push the fuel element into the destination location provided for this purpose, for example a cutting machine;

release the fuel element;

C/ regardless of the position:

put the gripping device and the handling system assembly back into configuration.

BRIEF DESCRIPTION OF THE DRAWINGS

Other characteristics and advantages of the invention will become clear after reading the detailed description given with reference to the following figures among which.

DETAILED PRESENTATION OF PARTICULAR EMBODIMENTS

The fuel element handling system S according to the invention comprises firstly a gripping device P.

This gripping device P comprises a main body 1 and a secondary body 2 with a longitudinal axis (XX') each provided with rolling means 3 such as rollers, thus forming carriages.

The terms main carriage and secondary carriage are used herein with reference to the fuel elements to be gripped. Thus, the main carriage 1, also called the grab, is the carriage that supports the fuel element gripping clamp 6 while the secondary carriage 2 is the intermediate carriage between the main carriage 1 and the front part of a lifting/pushing chain 200 that for example does the horizontal and vertical handling. This front part is also called the pushing chain nose.

Figures 1, 1A:
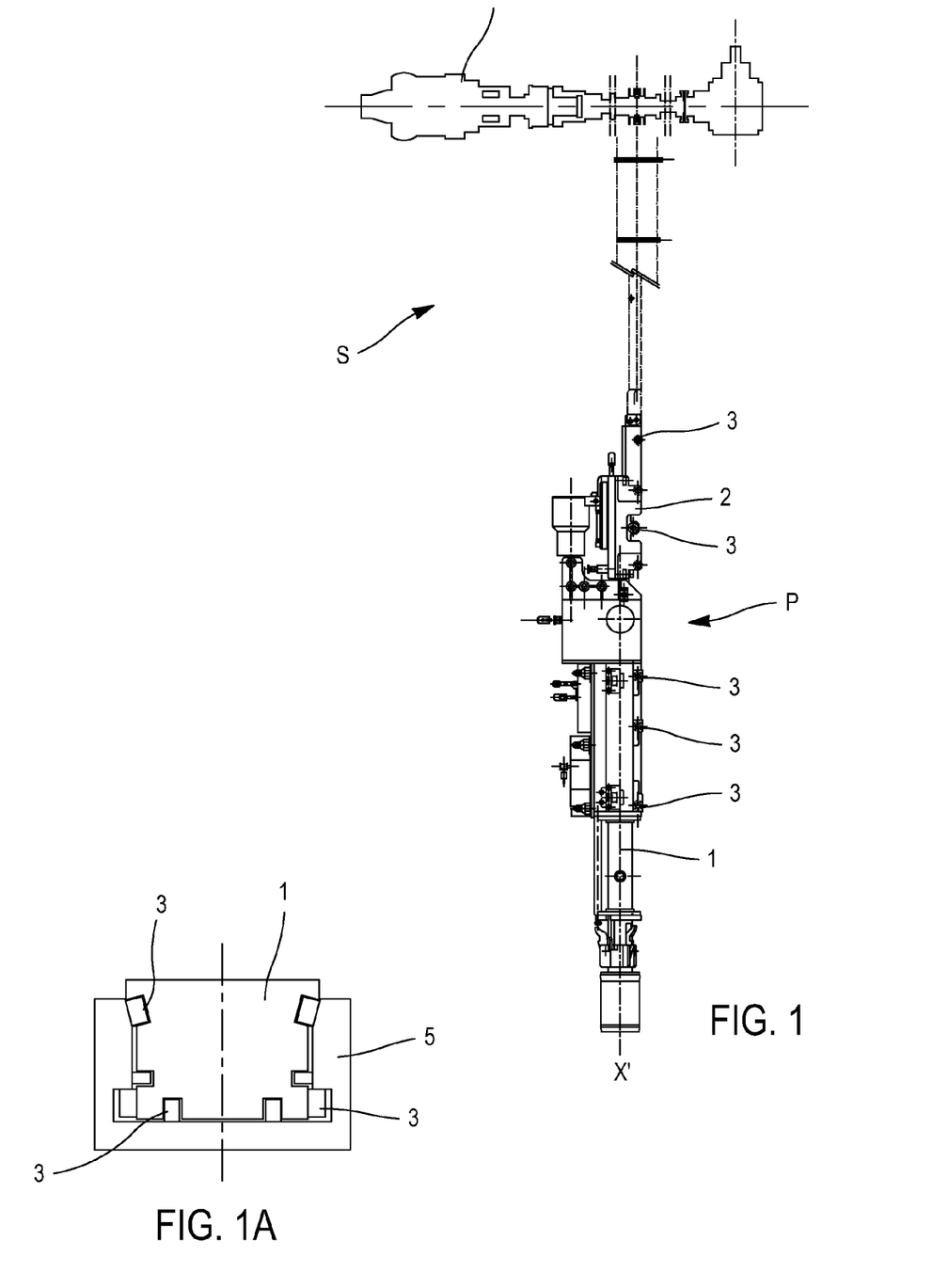
FIG. 1 is a general view of a handling system according to the invention using a gripping device according to the invention.
FIG. 1A is a diagrammatic sectional view of the gripping device according to the invention.

In the handling system S according to the invention S, the secondary carriage 2 is attached by its attachments means 20 to a lifting and pushing system which is adapted to be lifted by motor 4 fixed to a tipping crane not shown (FIG. 1).

The tipping crane enables the gripping device P to tip from the vertical to the horizontal. The kinematic handling chain comprises the lifting/pushing chain actuated by a motor drive assembly. Handling systems with chains or cables were used in previous devices according to the state of the art, since handling was only vertical.

The gripping device P comprises firstly a main body 1 rolling in a U-shaped drum 5 of the tipping crane through rolling means 3.

This drum 5 of the tipping crane firstly enables guidance of the gripping device P by bearing of the gripping device in the horizontal and the vertical position, and secondly sliding of the picked up fuel elements during their horizontal transfer to an appropriate cutting machine (FIG. 1A).

This main body 1 is coupled with a gripping clamp 6 for gripping fuel elements (not shown). In the lifting position, the clamp 6 thus coupled is in the lower part of body 1.

Figure 2:
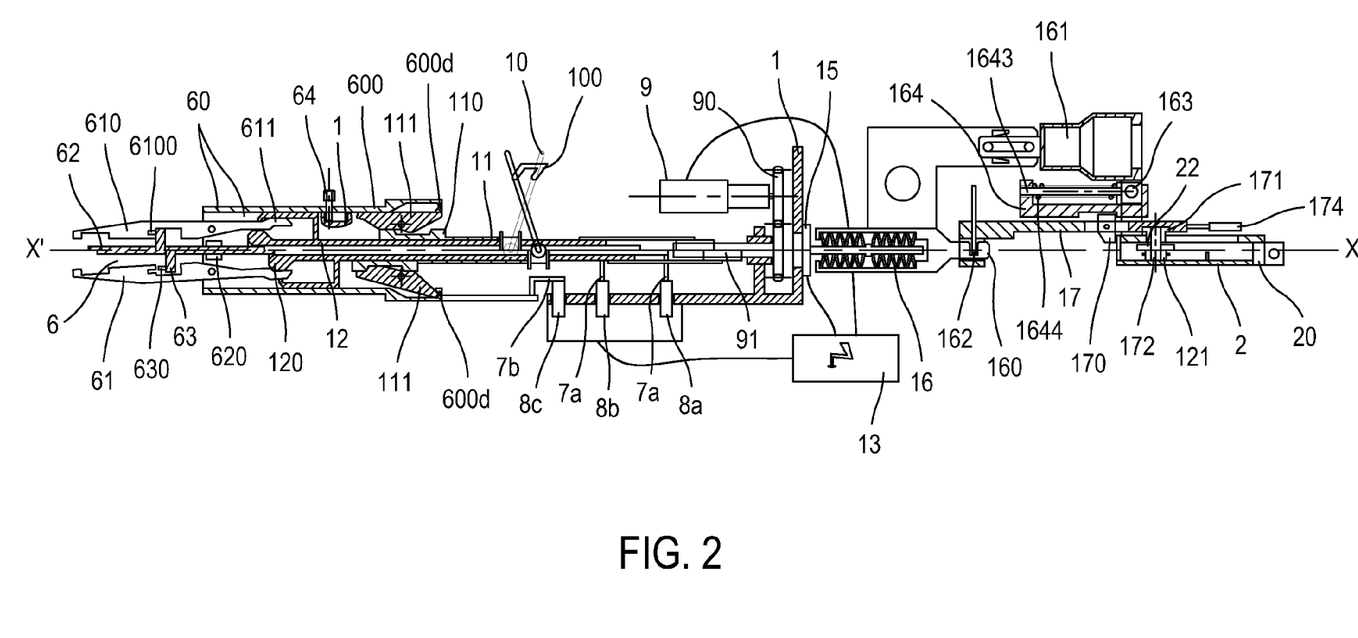
FIG. 2 is a diagrammatic longitudinal sectional view of a gripping device according to the invention.
Figure 2A:
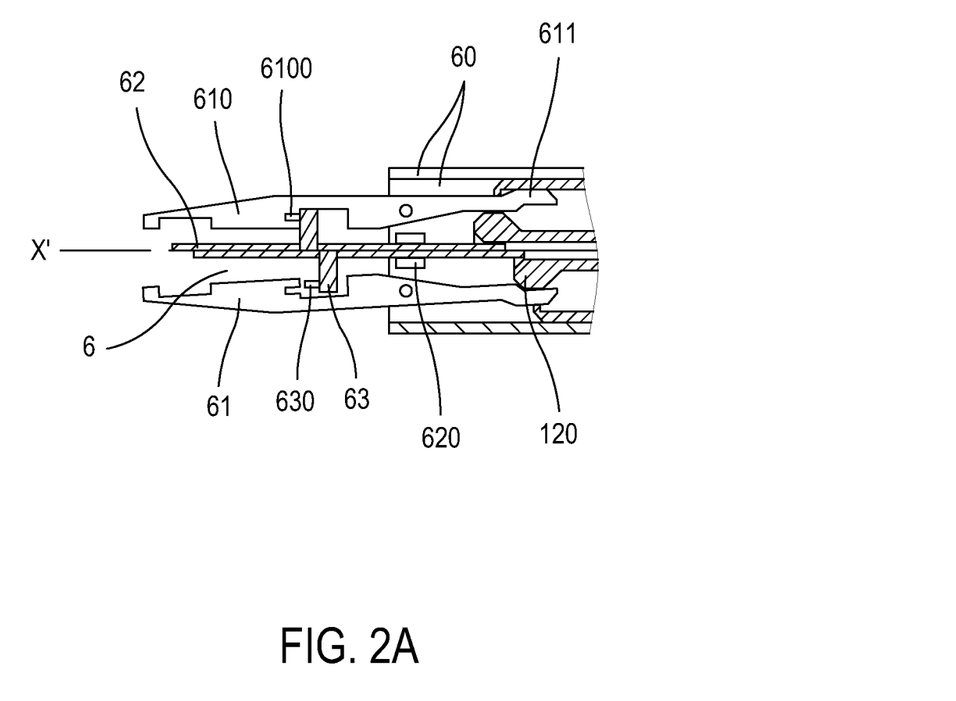
FIG. 2A is a diagrammatic view extracted from FIG. 2 showing a clamp according to the invention and capable of gripping fuel elements.

FIG. 2A shows a clamp 6 suitable for use with the invention. It comprises the following elements:

1/ a tubular block 60, for which the inner shape is suitable for coupling with the main body 1;

2/ fuel elements gripping arms 61 that are installed free to tip orthogonally to the XX' axis, each of which comprises a part forming a gripper 610 the shape of which is adapted to the type of fuel element to be handled, and a part 611 with a shape adapted to make the different tipping movements (moving the arms 61 closer or further apart), as described below;

3/ a fuel element presence detection rod 62 assembled free to translate in guides 620 fixed to the tubular block 60;

4/ a mechanical lock 63 fixed to the detection rod 62 prevents any manoeuvring movement of the grippers 610 firstly when the fuel element is not detected (gripping manoeuvre) and secondly during handling of the fuel element (unexpected opening - the rod drops during clearance correction during the lifting operation). In the embodiment shown (FIGS. 2 and 2A), the mechanical lock 63 is composed of claws 630 fixed transverse to the rod 63 that engage into complementary shaped recesses 6100 formed inside the grippers 610 in a translated position of the rod 62. In other words, the clamp 6 thus defined comprises a sort of a solely mechanical system self-locking its arms 61 by engaging the claws 630 inside the arms in the extreme open or closed position corresponding to the fuel element gripping position.

In the embodiment shown in FIG. 2, a secondary locking system 64 is also provided that locks said coupling once the clamp 6 has been coupled with the main body 1. As shown, this system is composed of a stud 64 fixed to the clamp 6 that is arranged to be orthogonal to the longitudinal axis XX' of the main body 1 and that may be actuated by remote-operated means.

The main body 1 comprises firstly a control system to enable coupling with the clamp 6. This control system is controlled manually by remote-operated means. This control system comprises a lever 10 that drives a cylindrical hollow shaft 11 in translation, a relief system being formed on the hollow shaft making it act like a cam 110, and this shaft drives several pins 111 in rotation. The coupling lever 10 may be blocked by a self-locking device 100 fixed to the main body 1. The cylindrical hollow shaft 11 is located around another hollow shaft 12 that controls fuel element gripping arms 61. The rod 62 of the fuel element presence detection system is inserted in one end 120 of this hollow shaft 12.

The gripping position of the clamp 6 in the embodiment shown in FIG. 2A corresponds to a mutual movement of the arms of the clamp 61 towards each other in an extreme closed position blocked in translation by pins 111. This position is electrically controlled by a mechanical flag 7a composed of a projection that extends transverse to the axis and that is positioned in front of an electrical position detector 8b. Another electrical position detector 8a detects the extreme open position when the flag 7a is placed in front of it.

The body 1 also comprises a control system for the fuel element gripping clamp 6. This system comprises an electric motor drive 9 that uses a gear 90 and a screw-nut type reduction gear 91 to drive one end of the hollow shaft 12 in translation. The other end of the shaft 12 is widened with a shape 120 that enables transmission of the movement by bearing on part 611 of the clamp 6.

The characteristic movement positions and the presence of the clamp body are electrically controlled by means of mechanical flags 7a, 7b that are placed in front of the position detectors 8a, 8b and 8c respectively. More precisely, the presence of a gripped fuel element is detected by a flag 7a and two electrical detectors 8a, 8b. The presence of the clamp 6 is detected by a flag 7b and a detector 8c, the position of the clamp 6 and a fuel element is detected by a flag 7a and two detectors 8a, 8b. The motor 9 with the gear 90 and the screw-nut system 91 can be manually disassembled by remote-operated means. It is electrically connected to an electrical box 13 through a remote-operated connector. This electrical box 13 is supported by the electrical power supply device for the motor 9, not shown. The position detectors 8, 8a, 8b are contained in a box 14 electrically connected to the box 13 and also supported by the electrical power supply device. The electrical box 13 is a box that groups the various electrical connections arriving on the grab 1, 6 and is electrically connected to the drum of the tipping crane through a cable-support chain.

The main body 1 also comprises an electronic weigh scale 15 connecting the gripping part 6, 7, 8, 9, 90, 91, 10, 11, 110, 111, 12, 120 of the permanent body 1 to an intermediate connecting system 16. This weigh scale 15 controls forces applied in the pulling and pushing directions during a lifting operation and a pushing operation respectively of the gripping device. This weigh scale 15 is electrically connected through a connector to the box 13 supported by the electrical power supply device. In the embodiment shown, the weigh scale 15 may be disassembled by remote-operated means, just like the plugged in connector.

The intermediate connecting system 16 comprises a fastener 160 connecting it to a head carriage 17 and a gripping socket 161 with a shape adapted to cooperate with lifting means fitted on a feed cell in which fuel elements to be picked up are immersed in a pool. The fastener 160 is in the shape of a U connected to the weigh scale 15.

The fastener 160 is fixed to the head carriage 17 by means of an inserted pin 162. This pin 162 is adapted so that it can be removed by remote-operated means.

The gripping socket 161 is used only if there is a failure in the operating chain.

The rolling manoeuvre of the device P in the drum 5 of the tipping crane will be actuated using the socket 161 (in vertical handling).

The gripping device also comprises a secondary carriage 2 provided with rolling means 3 and coupled with the head carriage 17 of the main body 1.

This secondary carriage 2 comprises attachment means 20 that are fixed to the lifting/pushing chain of the handling system.

Coupling between carriages 1 and 2 is also done by force transmission means transmitting forces exerted on the attachment means 20 when lifting the device and during a horizontal push on the device.

As shown, the force transmission means are composed of an assembly of two keys 170, 171.

Figure 3A:
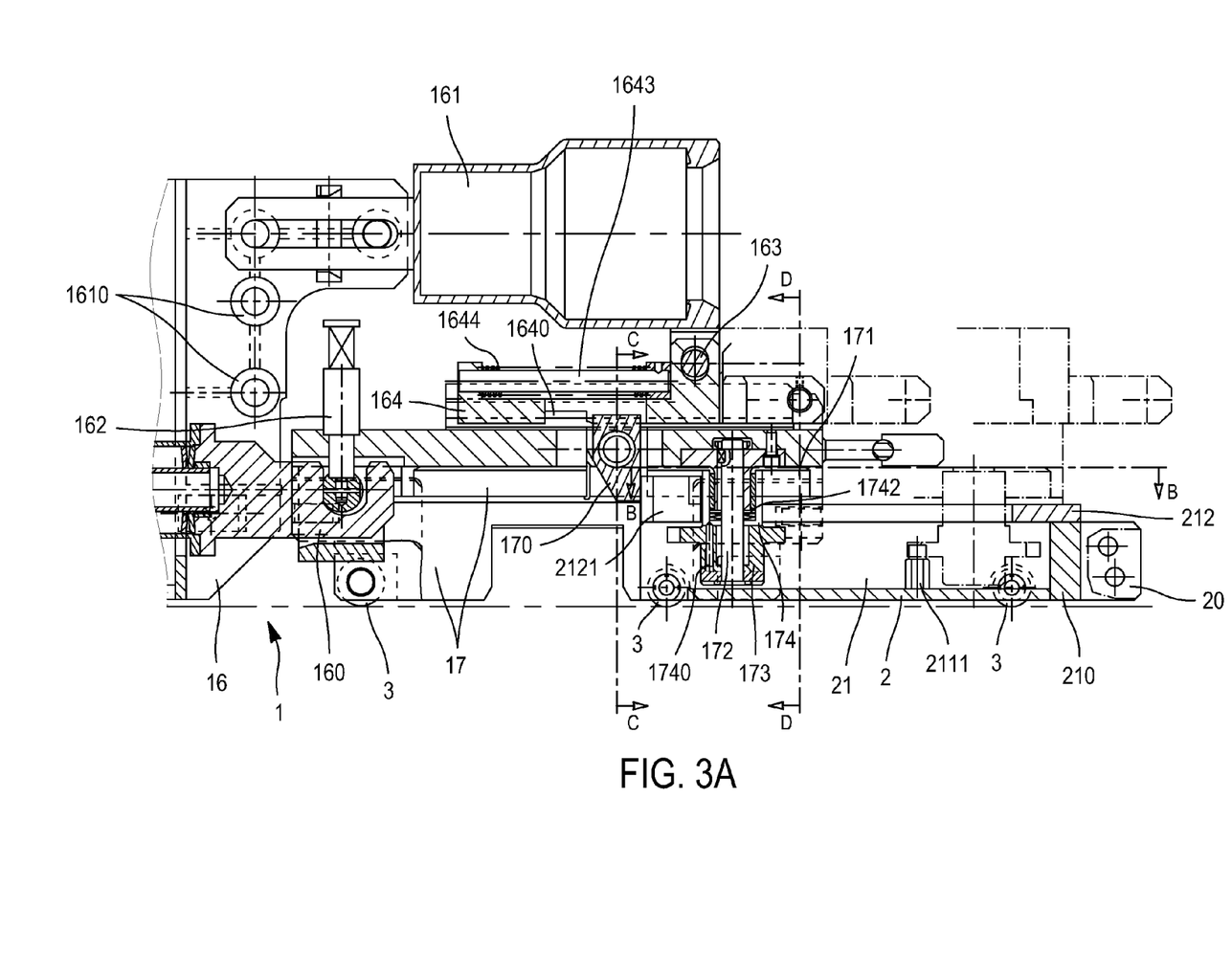
FIG. 3A is a partial longitudinal sectional view showing part of the gripping device according to one variant of the invention.

The first key 170 is installed free to tip transverse to the XX' axis. A pin 163 fixes the gripping socket 161 to the base 164 that slides on the carriage 17 and between parts 1640, 1641 and 1642 the base 1640 of which supports a pin 1643 (FIGS. 3A and 3C). A spring 1644 holds the assembly composed of the socket 161 and the pin 163 in the end stop position (FIGS. 3A and 3C).

The second T-shaped key 171 is installed free to pivot about a pivot axis 172 fixed to the head carriage 17 orthogonal to the XX' axis.

Thus, during normal operation of the fuel element handling system, the keys 170 and 171 bear in contact with a front part of the secondary carriage 2 composed of pads 2121 such that:
  during lifting, the non-pivoted key 171 bears in contact with the pads 2121 of the secondary carriage 2 (see view in solid lines in FIG. 3E),
  during pushing, the secondary carriage 2 bears in contact with the key non-tipped 170 (FIG. 3A).

A lever arm system 173 described below is also installed free to pivot around the pivot axis 172 (FIGS. 3A to 3E). This lever arm system 173, arranged below the second key 171 is locked to it in two angular positions through a lock system 174 described later. Thus, the lever arm system 173 and the second key 171 are fixed in rotation in these two angular positions by the lock 174, but are free in rotation from each other between these two angular positions.

The secondary carriage 2 comprises a frame 21 with a U-shaped cross section and a base 210. A pin 211 is fixed on this base 210. The base 210 is closed on the top by a cover 212 (FIGS. 3B and 3E).

Figure 3B:
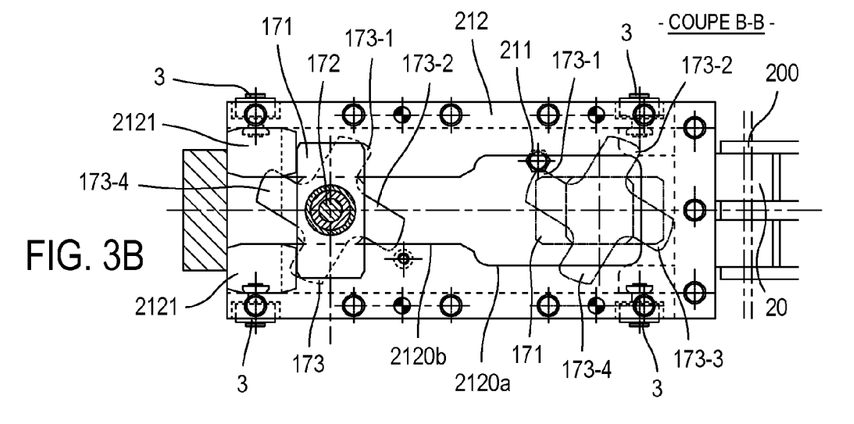
FIGS. 3B to 3D are sectional views of the device shown in FIG. 3A.
Figure 3C:
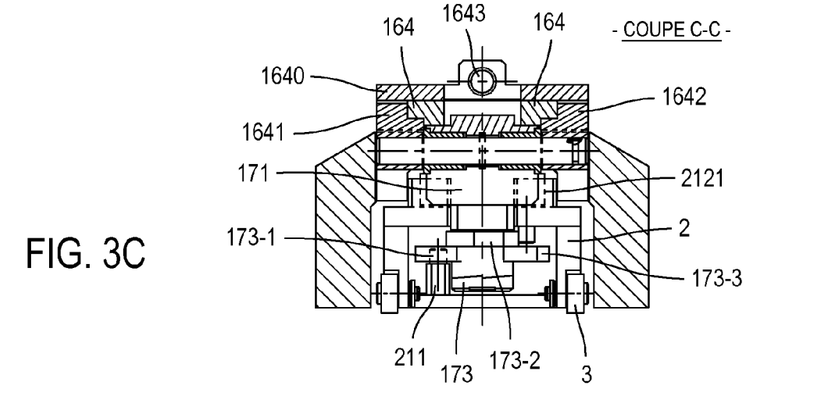
Figure 3D:
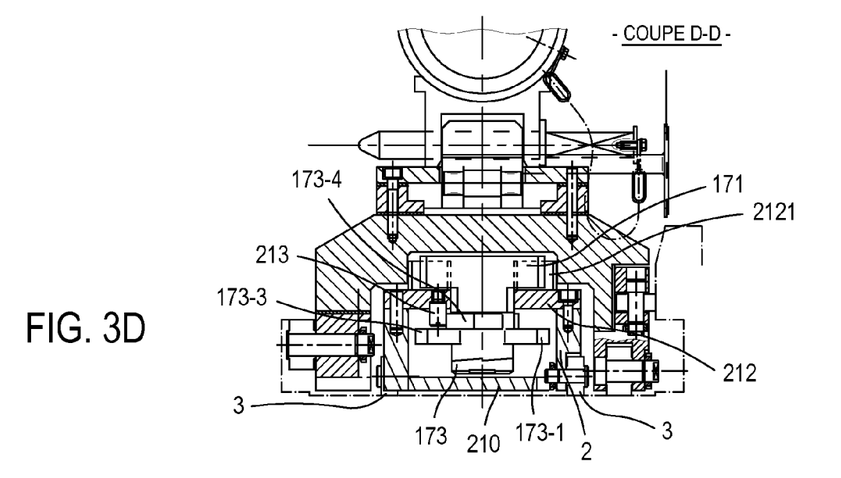
Figure 3E:
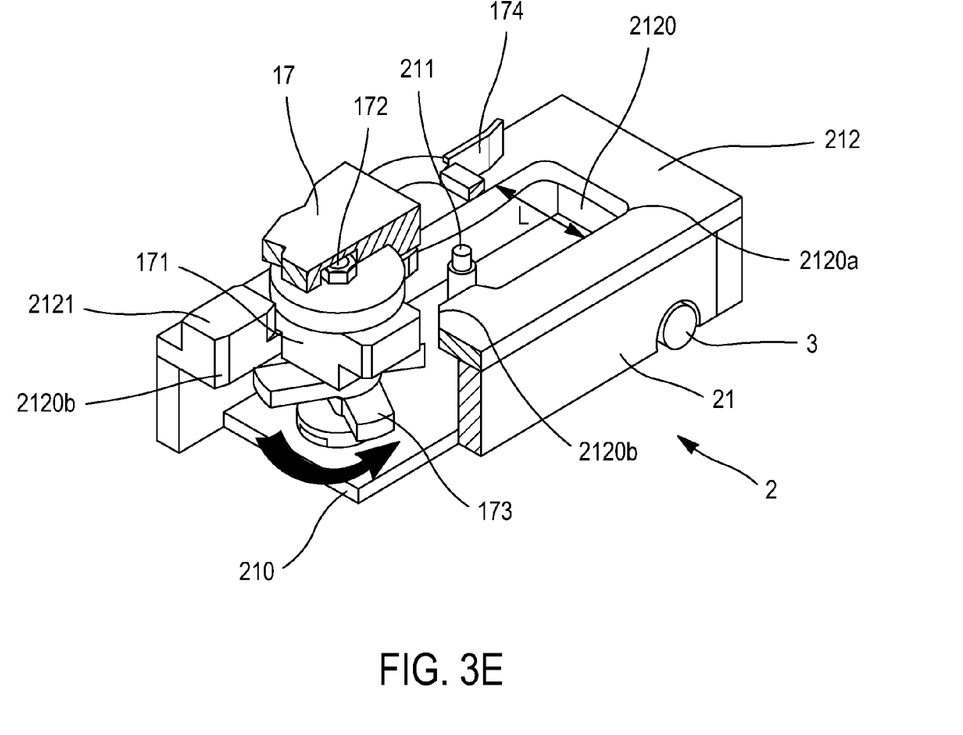
FIG. 3E is a detail perspective view showing one variant embodiment of part of a gripping device according to the invention.

This cover 212 comprises firstly a slot 2120, arranged to block the lever arm system 173 vertically in position inside the frame 21 when the head carriage 17 and the secondary carriage 2 are coupled to each other (FIGS. 3B and 3E).

The slot 2120 has a first portion 2120a closed on the side of the attachment means 20 and with width L larger than the bottom of the T of the key 171 and a second portion 2120b flush with the first portion 2120a (FIGS. 3B and 3E).

The cover 212 also comprises pads 2121 that form projections arranged on each side of the open portion 2120b of the slot 2120. These pads form the front part of the secondary carriage 2 on which keys 170 and 171 bear to transmit forces between the head carriage 17 and the secondary carriage 2 coupled to each other.

Thus, as described below, the shapes of the carriage 2 and the pivoting key 171 are designed to enable coupling and uncoupling of a part (main carriage 1) of the gripping device P of the lifting/pushing chain (to which the secondary carriage 2 remains fixed) in the case of incidents or for maintenance operations, using the surrounding cell remote-operated and lifting means only.

Furthermore, for some maintenance operations on the kinematic handling chain of the handling system S, the connecting arm of the socket 161 shall be provided with ducts 1610 that broach the gripping device P onto the drum 5 of the tipping crane.

The case of a failure of the handling chain that affects the gripping device P and solutions to overcome this failure in accordance with the embodiment shown are described below:
Blockage of the lifting chain in the vertical position:

Repair operations are as follows:

a/ gripping of the gripping device P and its load (fuel elements gripped by the clamp 6) at the socket 161 using the handling means of the cell in which the fuel elements are located;

b/ lifting: this movement drives the base 164 by compressing the spring 1644 and thus releasing the tipping key 170. This generates relative movement between the head carriage 17 and the secondary carriage 2; the key 171 then pivots from its angular bearing position against the pads 2121 (see the solid lines in FIG. 3B) to another position in which it can slide in the groove 2120a but cannot bear against the pads 2121 (see the chain dotted lines in FIG. 3B);

c/ lowering: this movement does not make key 171 pivot. The bottom of the T of the key 171 prevents rotation because it is guided in the portion 2120b of the slot 2120;

d/ after lowering according to c/, the device P and its load (fuel elements gripped by the clamp 6) are released from the lifting/pushing chain and may be transferred using the cell lifting apparatus.

For the transfer, the socket 161 can be pivoted by removing the pin 163. The socket 161 then rotates about an axis fixed to the intermediate connecting system 16 after the socket 161 translates upwards. Rotation of the socket 161 enables the grab 1, 16, 6 to come into an equilibrium position once it has been removed from the drum of the tipping crane.

Once the device P and its load have been put down in a safe position, the load (fuel elements and their gripped support) may be released from the gripping device and the clamp 6 by the following operations:

electrical power is supplied to the load gripping motor 9 if the motor is still operational;

or release the clamp 6 of the main body 1 (actuation of the coupling lever 10), lifting of the device generates a relative movement between the body 1 and the clamp 6 and this movement moves the load gripping fingers 610 apart and consequently releases the load, the clamp 6 then being driven and released by means of the safety lock 64.

Blockage of the Lifting Chain in the Horizontal Position:

Two cases can arise:

the situation allows a return to the vertical position: repair is done as described above after tipping using the tipping crane;

it is impossible to return to the vertical position:

*repeat the operations described in the previous section, using a push/pull means instead of the cell lifting means. After disconnecting the gripping device P from the lifting/pushing chain, the device P and its load (fuel elements gripped by the clamp 6) are pushed into a safe position;

*uncoupling of the load (fuel elements) from the clamp 6 according to the principles described above;

*removal of the device P with its clamp 6 for repair.

We will now describe steps b/ and c/ in which the main carriage 1 and the secondary carriage 2 are uncoupled, in more detail.

Firstly, note that the lever arm system 173 in the embodiment shown (FIGS. 3A to 3E), is a single piece part composed of two pairs of two arms 173-1, 173-3 and 173-2, 173-4. Each pair is arranged on different levels along the pivoting axis 172, the two arms 173-1, 173-3 and 173-2, 173-4 in one pair are approximately diametrically opposite each other relative to the pivot axis 172, while two arms 173-1, 173-2 of two different pairs form an angle of the order of 90°. Thus, in the view shown along axis 172, the lever arm system 173 is approximately in the form of a right-angled cross (See FIG. 3B).

Apart from the pin 211 fixed onto the base 210, the secondary carriage according to the invention includes another pin 213 fixed below the cover 212 in the area of the reduced slot 2120b.

Relative translation of the head carriage 17 towards the secondary carriage 2 (corresponding to an upwards movement of the blocked carriage 2 or a downwards movement of the blocked carriage 17) firstly makes the base 164 tip the key 170. This translation then brings one of the lever arms 173-1 into contact with the pin 211 fixed onto the base 210 that then turns the fixed key 171 in rotation by a quarter of a turn; the key 171 is then positioned such that its length is parallel to the translation movement (see key 171 in chain dotted lines in FIG. 3B). This position is authorised because the key 171 is free to turn in the widened slot 2120a. This allows the secondary carriage 2 to be uncoupled from the main carriage 1.

Then, by relative translation of the head carriage 17 by separating it from the secondary carriage 2, the pin 213 comes into contact with another of the lever arms 173-2 located at a different level from the level of the lever arm 173-1, which once again pivots the arm system 173 by a quarter of a turn, but not the key 171 that is blocked in rotation. The bottom of the key 171 is blocked in rotation in the area of the slot 2120b.

This final quarter-turn rotation repositions the lever arm system 173 into an angular position 180° from its initial position. The result is recoupling of secondary carriage 2 and main carriage 1 by reassembly of the connection between the key 171 that once again bears in contact with the pads 2121, following a single push/pull movement exerted on the main carriage 1.

Thus in summary, the following operations are done in the embodiment shown in FIGS. 3A to 3E:

1/ Uncoupling operation: a tension movement towards the back of the secondary carriage 2 blocked in translation brings the arm 173-1 in bearing in contact with the pin 211, which pivots the key 171 into its angular release position (see the illustration in chain dotted lines in FIG. 3B). A forward pushing movement then brings the arm 173-4 that is on a different level from the arm 173-1, into contact with the pin 213, which makes the lever arm system assembly 173 pivot without pivoting the key 171, following a second rotation, on an identical travel distance in the same direction as the first rotation caused by the pin 211. The key 171 is prevented from pivoting during this second rotation by the locking system 174 that enables rotation of the lever arm system 173 relative to the key 171 when the key is held blocked in rotation (in slot 2120b).

2/ Recoupling operation: a pushing movement of the head carriage 17 or the main carriage 1 assembly by inserting the key 171 into the slot 2120b in the secondary carriage brings one of the arms 173-1, 173-3 once again in contact with the pin 211 and thus positions the key 171 fixed in rotation once again in its blocked position by pads 2121. In the embodiment shown in FIG. 3B, since the arm in contact with the pin 211 was arm 173-1 during uncoupling, the arm in contact with the pin 211 during recoupling is the other arm 173-3.

In the embodiment shown in FIG. 3A, the lock 174 is composed of a ball/recess pushing system arranged between the pivoting key 171 and the lever arm system 173. More precisely, balls 1740 are fitted in the single-piece part 173 and are blocked in four angular positions at 90° from each other, in recesses 1741 with a complementary shape formed in the lower part of the key 171. A spring not shown (included in the balls 1740) is used to hold the balls 1740 in their recesses 1741, and these balls require application of a minimum force to rotate the system 173 without rotating the key 171. Another spring 1742 holds the arm system 173 in the notches.

In the embodiment shown in FIG. 2A, the clamp 6 is a clamp in which the fingers 610 move towards each other to pick up the fuel elements. Obviously, a clamp in which the arms are separated from each other to pick up the fuel element head would be within the scope of the invention, provided that it can be coupled with the main body.

The clamp 6 according to the invention, although shown in the context of the invention to grip fuel elements, can be perfectly well used in other applications in which it is required to lock the arms of the clamp onto the element gripped by the clamp.

The invention claimed is:

1. Fuel elements gripping device comprising:
   a main carriage oriented along a longitudinal axis,
   a clamp coupled to the main carriage and adapted to grip a head of fuel elements,
   a secondary carriage oriented along the longitudinal axis and comprising attachment means for attaching the secondary carriage to a lifting/pushing chain, wherein the main carriage and the secondary carriage are coupled to each other by force transmission means, said force transmission means transmitting forces applied to the attachment means when the device is lifted and when the device is pushed horizontally, the force transmission means forming a dismountable connection between the main carriage and the secondary carriage, wherein the main carriage and the secondary carriage are adapted to be uncoupled from each other in a blocked position of the secondary carriage in which the secondary carriage is attached at its attachment means to the lifting/pushing chain, by dismounting the dismountable connection of formed by the force transmission means between the carriages, the connection being dismounted by only applying a pulling force and a pushing force to the main carriage, the pulling force being applied towards the secondary carriage.

2. Gripping device according to claim 1, in which recoupling between the main carriage and the secondary carriage is done, in a blocked position of the secondary carriage in which the secondary carriage is attached at its attachment means to the lifting/pushing chain, by reassembling the connection formed by the force transmission means between the carriages, the connection being reassembled by only applying a pulling force and a pushing force to the main carriage, the pulling force being applied towards the secondary carriage.

3. Gripping device according to claim 1, in which the force transmission means forming a dismountable connection between the main carriage and the secondary carriage comprise:
   a first key, mounted on the main carriage, the first key being tippable transverse to the longitudinal axis and being in abutment against the secondary carriage to enable forces applied to the attachment means to be transmitted when the pushing force is applied,
   a second key, mounted on the main carriage, pivotable orthogonally to the longitudinal axis and being in abutment against the secondary carriage to enable forces applied to the attachment means to be transmitted during lifting;
   wherein the pulling force applied to the main carriage enables tipping of the first key, the relative movement of the main carriage towards the secondary carriage and then pivoting of the second key, until the first tipped key and the second pivoted key each remaining in a position free from abutment with the secondary carriage.

4. Gripping device according to claim 1, in which the main carriage comprises two rigid parts connected to each other by a flexible connection, in which:
   one rigid part is coupled with the clamp and comprises an electronic weigh-scale to electrically test tension or compression forces applied to said rigid part supporting the clamp;
   the other rigid part comprises a so-called head carriage which is coupled with the secondary carriage in an assembled state of the fuel elements gripping device, the other rigid part also comprising a gripping socket to which the pulling force and the pushing force for uncoupling the dismountable connection are applied.

5. Gripping device according to claim 1, in which the main carriage comprises:
   an electric motor,
   a main carriage body,
   a hollow shaft mounted in translation on the main carriage body, one of hollow shaft ends being fitted with a screw/nut type drive engaged with the electric motor, and the other of the hollow shaft ends bearing on part of the clamp gripping arms, actuation of the electric motor causing translation of the shaft in one direction and simultaneously moving the gripping arms of the clamp towards or away from each other by tipping orthogonally to the axis.

6. Gripping device according to claim 5, comprising a coupling lever fixed to the main carriage and arranged to form a lever arm to translate the hollow shaft and uncouple it from the clamp, the lever arm being adapted so that it can be manipulated by remote operated means.

7. Gripping device according to claim 6, in which
   the main carriage comprises pins mounted free to tip orthogonally to the longitudinal axis;
   the clamp body comprises a wall with steps;
   the hollow shaft comprises relief fixed to its periphery; coupling between the clamp and the shaft being made by the relief tipping the pins and by the tipped pins bearing in contact with the steps in the clamp body.

8. Gripping device according to claim 7, comprising, a peg forming locking means for coupling the main carriage body and the clamp, a the peg being inserted inside the wall of the clamp body transverse to the longitudinal axis of the main carriage body to block one in translation relative to the other, the peg being designed so that it can be removed by remote-operated means.

9. Gripping device according to claim 7, in which:
   the hollow shaft comprises a projection that extends transverse to the axis forming a shaft flag,
   the main carriage comprises a first and a second position detector each arranged so as to be facing the flag in a respective given translated position of the hollow shaft to electrically detect a respective given translated position of the relief and therefore detect whether or not the pins are tipped.

10. Gripping device according to claim 9, in which:
    the clamp body comprises a projection that extends transverse to the axis forming a clamp flag,
    the main carriage comprises a third position detector arranged to be facing the clamp flag when the clamp is coupled with the main carriage, and thus arranged to electrically detect the presence of the clamp.

11. Gripping device according to claim 5, in which:
    the clamp comprises a body on which the gripping arms are installed free to tilt and on which a clamp rod is installed free to slide along the axis between the arms, the hollow shaft comprises a rod fixed inside it, the rod of the hollow shaft bearing in contact with the clamp rod, the length of the clamp rod being such that in the near or the far extreme position of the clamp gripping arms corresponding to the gripping position of the fuel element head, there is a direct contact between the fuel element head and the clamp rod.

12. Gripping device according to claim 11, in which:
the hollow shaft comprises a projection that extends transverse to the axis forming a shaft flag,
the main carriage comprises a first position detector arranged so as to be facing the flag so that it electrically detects direct contact between the fuel elements head and the clamp rod.

13. Fuel elements handling system comprising:
a tipping crane comprising a drum in which carriages of the fuel elements gripping device are installed, having:
a main carriage oriented along a longitudinal axis,
a clamp coupled to the main carriage and adapted to grip a head of fuel elements,
a secondary carriage oriented along the longitudinal axis and comprising attachment means for attaching the secondary carriage to a lifting/pushing chain, wherein the main carriage and the secondary carriage are coupled to each other by force transmission means, said force transmission means transmitting forces applied to the attachment means when the device is lifted and when the device is pushed horizontally, the force transmission means forming a dismountable connection between the main carriage and the secondary carriage, wherein the main carriage and the secondary carriage are adapted to be uncoupled from each other in a blocked position of the secondary carriage in which the secondary carriage is attached at its attachment means to the lifting/pushing chain, by dismounting the dismountable connection formed by the force transmission means between the carriages, the connection being dismounted by only applying a pulling force and a pushing force to the main carriage, the pulling force being applied towards the secondary carriage;
a handling chain comprising a lifting/pushing chain, wherein part of the lifting/pushing chain is fixed to the attachment means of the secondary carriage of the gripping device, the lifting/pushing chain being adapted to roll the fuel elements gripping device out of the tipping crane drum, when the fuel elements gripping device is in an horizontal position.

14. A method for handling fuel elements with a fuel elements gripping device, wherein if a failure occurs during a handling operation:
part of the fuel elements gripping device is attached to mechanical intervention handling means,
part of the fuel elements gripping device attached to the mechanical intervention means is uncoupled from the remaining of the fuel elements gripping device attached to a mechanical operational handling means using remote-operated means,
said fuel elements gripping device comprising:
a main carriage oriented along a longitudinal axis,
a clamp coupled to the main carriage and adapted to grip a head of fuel elements,
a secondary carriage oriented along the longitudinal axis and comprising attachment means for attaching the secondary carriage to a lifting/pushing chain, wherein the main carriage and the secondary carriage are coupled to each other by force transmission means, said force transmission means transmitting forces applied to the attachment means when the device is lifted and when the device is pushed horizontally, the force transmission means forming a dismountable connection between the main carriage and the secondary carriage, wherein the main carriage and the secondary carriage are adapted to be uncoupled from each other in a blocked position of the secondary carriage in which the secondary carriage is attached at its attachment means to the lifting/pushing chain, by dismounting the dismountable connection formed by the force transmission means between the carriages, the connection being dismounted by only applying a pulling force and a pushing force to the main carriage,the pulling force being applied towards the secondary carriage.

15. Handling method according to claim 14, in which the handling operation is either lifting, or horizontal tipping or horizontal pushing.

16. Method according to claim 14, according to which the actuation of the remote-operated means advantageously applies a pulling force and a pushing force to the main carriage for separating the part of the fuel elements gripping device attached to the mechanical intervention means from the remaining of the fuel elements gripping device.

* * * * *